May 26, 1964   MASATERU TAKAGI ETAL   3,134,977
WAVE SOURCE POSITION DETECTING SYSTEM
Filed Oct. 6, 1960
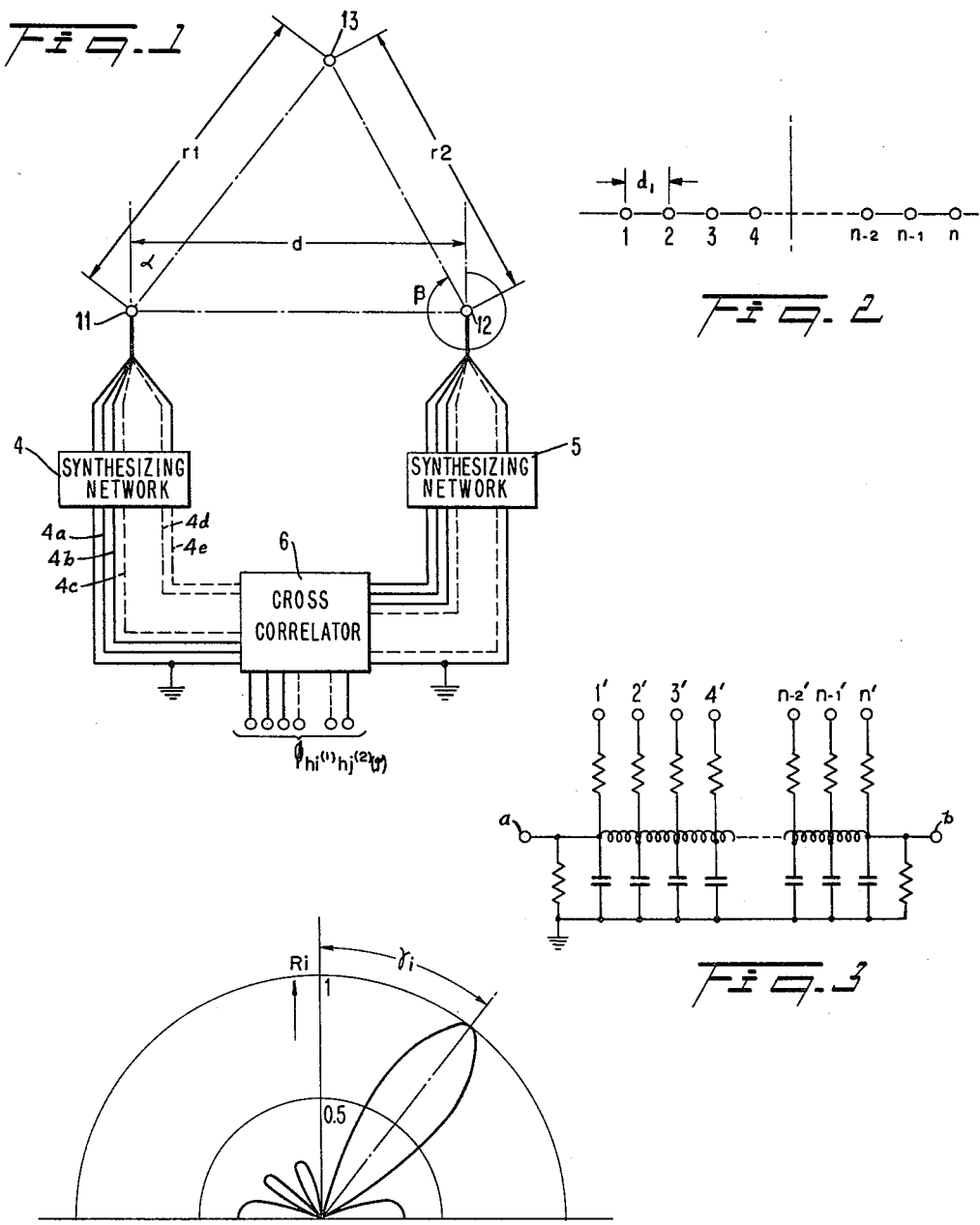
INVENTORS
MASATERU TAKAGI
MASAO KUMANO
BY
Roy C. Hopgood
ATTORNEY United States Patent Office 3,134,977
Patented May 26, 1964

3,134,977
WAVE SOURCE POSITION DETECTING SYSTEM
Masateru Takagi and Masao Kumano, Tokyo, Japan, assignors to Nippon Electric Company Limited, Tokyo, Japan, a corporation of Japan
Filed Oct. 6, 1960, Ser. No. 60,834
3 Claims. (Cl. 343—112)

This invention relates to a system for detecting a source of radiant energy, and more specifically to such a system which determines the position of the source by correlation techniques.

Systems are known for determining the location of a source of radiant energy which utilize diversity reception principles. These systems require at least two diverse or separately located receiving stations where the radiated energy is received and processed for strength, the strength or amplitude of the signals being used to determine the location of the wave source. Such systems have been known generally as radio frequency direction finding systems.

Systems for determining the location of a wave source generally are required to make such a determination at receiving locations which may be separated by long distances from the wave source. Accordingly, it is important in these systems that the strength of the signal at least exceed the noise level. However, as is well known, the spectrum of radio frequencies is becoming more crowded, which results in a higher noise level when operating in such a spectrum. The known systems are not capable of operating efficiently, or in many instances at all, where the noise level is approximately equal to, or greater than, the level of the wave source energy.

Accordingly, it is a primary object of this invention to provide a system which is capable of determining the position of a wave source by minimizing the ambient noise level.

It is a further object of the invention to provide a system which operates on correlation principles and which employs a plurality of wave source receivers having selectively controlled radiation patterns.

In accordance with an aspect of the invention, there is provided a system for detecting the position of a wave source by means of cross correlation functions between outputs of a plural number of wave receiving points. The invention is characterized in that the receiving points have directivity patterns which are directed at the wave source. By separating the receiving points by substantial distances, the novel system is capable of locating the position of the wave source.

The above mentioned and other features and objects of this invention and the manner of attaining them will become more apparent and the invention itself will be best understood by reference to the following description of an embodiment of the invention taken in conjunction with the accompanying drawing, wherein:

FIG. 1 is a block diagram of an embodiment of the invention;

FIG. 2 is a simplified representation of a broadside antenna array showing the distribution of the elements;

FIG. 3 is a simplified schematic diagram of a directivity synthesizing circuit; and FIG. 4 is a radiation lobe pattern of the antenna array.

In FIG. 1, 11 and 12 suggest two positions spaced a distance and apart where plural numbers of receiving elements are arranged in order; 13 shows a signal source; $\alpha$ and $\beta$ are angles taken by viewing 13 from 11 and 12 respectively; $r_1$ and $r_2$ are lineal distances measured from 11 and 12 to 13 respectively.

At each position 11 and 12, there is located a broadside array each consisting of $1-n$ receiving elements in line, as shown in FIG. 2. The numerals 4 and 5 of FIG. 1 indicate multiple directivity synthesizing networks connected to the receiving elements at the positions 11 and 12 respectively and their outputs form directional groups of $m$ channels whose main lobes are arranged in equal angular spacing within a search sweep or scope.

FIG. 3 shows an example of one such directivity synthesizing network for only one channel. Each complete directivity synthesizing network 4 and 5 consists of $m$ sub-networks or sections, each having a construction as shown in FIG. 3. All corresponding input terminals $1', 2', 3'. . .n'$ of the $m$ network sections are connected together for connection, in turn, to the corresponding signal receiving elements $1, 2, 3. . .n$. The output terminals $a, b,$ of the network section shown in FIG. 3 are connected, respectively, by means of the wires $4a$ and $4b$ to the left side of the cross-correlator 6. Thus the network section of FIG. 3 has two outputs connected to the cross-correlater input, one between the terminal $a$ and ground and the other between the terminal $b$ and ground. The output terminals of the additional $m$ network sections are connected to the left side of the cross-correlator 6 by means of additional wires represented by the dashed lines $4c, 4d$ and $4e$. Similar connections as just described connect the synthesizing network 5 to the right side of the cross-correlator 6. Characteristics of each directivity synthesizing circuit can be determined in such manner as to produce $n$ main lobes in equal angular spacing within the scope of the desired search angle.

When the angle of the main lobe of the $i$th output is given as $\gamma i$ of the directivity synthesizing network relative to the line of the array, then the phase shift $\varphi m$ which must be given between adjacent elements in the array should satisfy the following Equation 1 as is known from the theory of linear broadside arrays:

$$\gamma i = \text{arc sin} \frac{\phi m}{k d_1} \quad (1)$$

where $k$ represents wave length and $d_1$ represents distance between elements which are equally spaced.

In such a multiple directivity synthesizing network, the directivity pattern of the $i$th output among $n$ pieces is represented by $Ri(\gamma)$, provided that $\gamma$ represents an angle between the signal source and the array. The pattern of $Ri(\gamma)$ would be represented in polar coordinates as shown in FIG. 4. Position of its main lobe would be at $\gamma = \gamma i$ as indicated in Equation 1.

Now, assuming that the $i$th output signal of the synthesized directivity among $m$ sections of the multiple directivity synthesizing network is $Si(t)$. Then, $Si(t)$ would be represented as follows:

$$Si(t) = K i R i(\gamma) \frac{\sin(\omega t - kr - \phi i)}{r} \quad (2)$$

where, $Ki$ represents an amplitude coefficient; $\phi i$ is a phase delay of the directivity synthesizing network; $\gamma$ is a direction of signal source and $r$ is the distance to the signal source.

If the $i$th output voltage of network 4 (associated with antenna sections at the position 11) hereinafter called the 1st set, is $Si^{(1)}(t)$ and that the $j$th output voltage of network 5 (associated with antenna sections at the position 12) hereinafter called the 2nd set, is $Sj^{(2)}(t)$, and if $\gamma$ and $r$ are substituted by $\alpha$, $\beta$ and $r_1$, $r_2$ respectively, then the following equations would be established.

$$Si^{(1)}(t) = KiRi(\alpha) \frac{\sin(\omega t - Kr_1 - \phi i)}{r_1} \qquad (3)$$

$$Sj^{(2)}(t) = KjRj(\beta) \frac{\sin(\omega t - Kr_2 - \phi i)}{r_2} \qquad (4)$$

If the noise is represented by $ni^{(1)}(t)$ and $nj^{(2)}(t)$ is superposed on $Si^{(1)}(t)$ and $Sj^{(2)}(t)$ respectively, the $i$th and $j$th output of each set would be as follows:

$$hi^{(1)}(t) = Si^{(1)}(t) + ni^{(1)}(t) \qquad (5)$$

$$hj^{(2)}(t) = Sj^{(2)}(t) + nj^{(2)}(t) \qquad (6)$$

Accordingly, the cross-correlation function $$\phi hi^{(1)} hj^{(2)}(t)$$

would be defined as follows:

$$\phi hi^{(1)} hj^{(2)}{}^{(t)} = \lim_{T \to \infty} \frac{1}{2T} \int_{-T}^{T} hi^{(1)}(t) hj^{(2)}(t^+) dt$$

$$= \lim_{T \to \infty} \frac{1}{2T} \int_{-T}^{T} [Si^{(1)}(t) + ni^{(1)}(t)] \cdot [Si^{(1)}(t^+) + nj^{(1)}(t^+)] dt$$

$$= \phi si^{(1)} Sj^{(2)}(t^+) + \phi ni^{(1)} Sj^{(2)}(t) + \phi Si^{(1)} nj^{(2)}(t) + \phi ni^{(1)} nj^{(2)}(t) \qquad (7)$$

Thus, if noise and a desired received signal are non-coherent, the 2nd and 4th terms inclusive would be zero. When an average time with regard to $t$, however, is not infinitely long, or an approximate cross-correlation function such as sampling, etc., is used (from the fact that integrating time is not infinitely long in practice and also with some technical difficulty such cross-correlators are used generally) the 2nd to 4th terms inclusive would not become zero even when noise and the desired receiving signal are non-coherent.

By this reason, the improvement in the degree of signal to noise ratio might be limited for some extent.

When an approximate device is used as cross-correlator, the 2nd to 4th terms inclusive become zero. We shall treat the terms, however, as zero in the following deductions.

Under this supposition, $$\phi hi^{(1)} hj^{(2)}(\tau) = \phi si^{(1)} Sj^{(2)}(\tau)$$

$$= \lim_{T \to \infty} \frac{1}{2T} \int_{-T}^{T} KiKj Ri(\alpha) Rj(\beta) \sin \frac{(\omega t - kr_1 - \phi i)}{r_1}$$

$$\times \sin \frac{\{(\omega(t+\tau) - kr_2 - \phi j)\}}{r} dt$$

$$= \frac{KiKj}{r_1 r_2} Ri(\alpha) Rj(\beta) \lim_{T \to \infty} \frac{1}{2T} \int_{-T}^{T} \sin(\omega t - kr_1 - \phi i)$$

$$\times \sin\{\omega(t+\tau) - kr_2 - \phi j\} dt \qquad (8)$$

Here, $$\lim_{T \to \infty} \int_{-T}^{T} \sin(\omega t - kr_1 - \phi i) \sin\{\omega(t+\tau) - kr_2 - \phi j\} dt$$

$$= \lim_{T \to \infty} \frac{1}{2T} \left[ \frac{1}{2} \int_{-T}^{T} \cos\{\omega \tau + k(r_1 - r_2) + \phi i - \phi j\} dt \right.$$

$$\left. - \frac{1}{2} \int_{-T}^{T} \cos\{2\omega t + \omega \tau - k(r_1 + r_2) - (\phi i - \phi j)\} dt \right]$$

$$= \frac{1}{2} \cos\{\omega \tau + k(r_1 - r_2) + (\phi i - \phi j)\}$$

If this latter equation is substituted into the Equation 7, then $$\phi hi^{(1)} hj^{(2)}{}^{(\tau)} = \frac{KiKj}{2r_1 r_2} Ri(\alpha) Rj(\beta)$$

$$\times \cos\{\omega \tau + k(r_1 - r_2) + (\phi i - \phi j)\} \qquad (9)$$

Consequently, the amplitude $Aij(\alpha, \beta)$ of $\phi hi^{(1)} hj^{(2)}{}^{(\tau)}$ would be $$Aij(\alpha, \beta) = \frac{KiKj}{2r_1 r_2} Ri(\alpha) Rj(\beta) \qquad (10)$$

The cross-correlator 6 in FIG. 1, is a conventional instrument which calculates a cross-correlation function between the $i$ output of the 1st set and the $j$ output of 2nd set ($i$ and $j$ being $m$ sections of 1, 2, 3 . . . $m$) so that $Aij(\alpha, \beta)$ could be obtained simultaneously. For information on such a cross-correlator, reference is hereby made to "A Computer for Correlation Functions" by F. E. Brooks, Jr. et al., appearing in the Review of "Scientific Instruments," vol. 23, No. 3, pp. 121–126, March 1952.

Now we shall examine the nature of $Aij(\alpha, \beta)$; $Ri(\alpha)$ would be maximum, when $\alpha = \gamma i$ as indicated in Equation 1. As $i$ is distributed in an equal angular spacing within a search scope and $\alpha$ is a continuous variable, $\alpha$ does not become exactly equal to $i$, but $Ri(\alpha)$ would be large when $i$ is close to it, otherwise it would be small.

As all of $ki$ could be made equal, $Aij(\alpha, \beta)$ would become $\alpha = \gamma i$, $\beta = \gamma j$ or would be maximum when $i$, $j$ are in the neighborhood of it.

Accordingly, if the maximum of the $Aij(\alpha, \beta)$'s is known, $i$ and $j$, $\gamma i$ and $\gamma j$ subsequently $\alpha$ and $\beta$ would also be known. Thus, the position of the signal source can be determined. Moreover, the more accurate the cross-correlator is, the more completely the influence of noise would be reduced.

Needless to say, there is no inconvenience in obtaining cross-correlation functions one after another by using a single directivity beam, when it is not necessary to obtain a result in a short time.

For simplification of explanation, we have cited a broadside array wherein the receiving elements are arranged in a straight-line. However, this is not essential and may be applicable to any directive beam as far as can be rotated. For instance, the receiving elements may be in a circular array or a vertically crossed loop-antenna, etc.

Further, if a receiving element is arranged in a focal plane of a suitable wave convergent system, for instance, parabola or lens, etc., it is well-known that the output of each receiving element would be biased by the direction of the beam. This system, however, could be used as a substitution of the multiple directivity synthesizing network.

While the foregoing description sets forth the principles of the invention in connection with specific apparatus, it is to be understood that this description is made only by way of example and not as a limitation of the scope of the invention as set forth in the objects thereof and in the accompanying claims.

What is claimed is:

1. A signal receiving system for determining the location of a source of electromagnetic wave energy comprising
   means at a plurality of spaced positions for receiving signals from said energy source,
   each of said receiving means having a main lobe pattern covering a predetermined area shared with the lobe patterns of the other receiving means,
   each of said receiving means including signal synthesizing means for providing output signals having a phase and amplitude dependent on the position of said source with respect to said lobe patterns,
   and means responsive to the output signals from each of said synthesizing means for developing output signal information indicative of the location of said energy source.

2. The system according to claim 1 wherein said receiving means includes an antenna array having a plurality of equally spaced signal receiving elements, and wherein said synthesizing means comprises a network having a plurality of input terminals, each of said terminals being connected to a separate element of said antenna array.

3. The system according to claim 2 wherein each of said antenna arrays is oriented to produce radially extending lobe patterns, and the axes of said lobes being substantially equally spaced.

References Cited in the file of this patent

UNITED STATES PATENTS

| 2,786,193 | Rich | Mar. 19, 1957 |
| 2,962,714 | Meixell et al. | Nov. 29, 1960 |
| 3,060,426 | Williams | Oct. 23, 1962 |

OTHER REFERENCES

Proceedings of the I.R.E., vol. 38, October 1950, pp. 1165–1171.

The Journal of the Acoustical Society of America, vol. 29, No. 12, December 1957, pp. 1342–1347.